Dec. 20, 1932.                H. L. MASON                1,891,551
               STOP VALVE FOR STEAM OR OTHER FLUIDS AND LIQUIDS
                             Filed Nov. 24, 1926
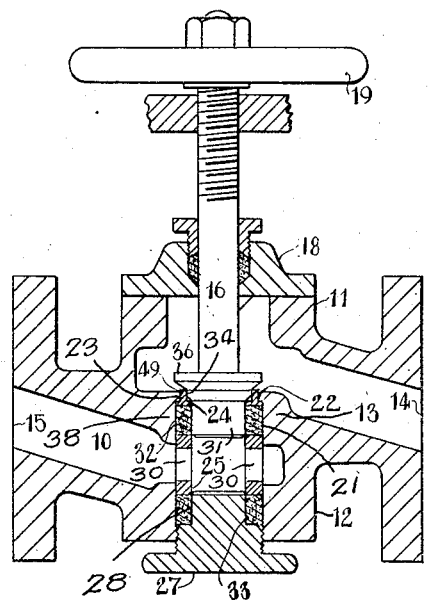
HAROLD LYALL MASON, *Inventor*
Attorneys Patented Dec. 20, 1932

1,891,551

UNITED STATES PATENT OFFICE

HAROLD LYALL MASON, OF HAMPSTEAD, LONDON, ENGLAND

STOP VALVE FOR STEAM OR OTHER FLUIDS AND LIQUIDS

Application filed November 24, 1926, Serial No. 150,590, and in Great Britain December 1, 1925.

My invention relates to stop valves for steam or other fluids and liquids.

My invention has for an object to provide a complete valve of simple and compact, but nevertheless effective, structure, and to this end it comprises a valve for steam and other fluids and liquids with closures in different planes, one of which is formed by a closure member and a seating and another by an imperforate piston forming part of the closure member and moving into and out of fluid tight sliding contact with an adjustable yielding packing element compressible from without the valves in the direction of the gland, the packing element comprising a plurality of packing rings at opposite ends of and supported by a cage member through which the fluid can flow. Furthermore it comprises the combination of parts all constructed, arranged and adapted for use substantially as I will now describe with reference to the accompanying drawings whereof the several figures each illustrate one arrangement in sectional elevation by way of example.

According to one arrangement in the form of a vertical structure wherein the valve proper is of the solid piston type, I, as shown in the figure, employ a casing comprising a chamber 10 and two cylindrical portions 11 and 12 integral therewith and projecting centrally thereof, one at the top and the other at the bottom in axial alignment. These cylindrical portions 11 and 12, which form extensions of the chamber 10, are substantially of the same diameter and communicate directly with the chamber 10 equipped with the customary bridge or diaphragm 13 for dividing the inlet and the outlet connections 14 and 15 respectively of the casing. The internal diameter of the extensions 11 and 12 is greater than that of the dual valve member 31 and piston 16, which projects through and beyond the upper extension 11 whose end is designed for the reception and connection of a stuffing box 18 wherethrough the piston 16 projects for operation in known fashion as depicted at 19.

The diaphragm or bridge 13 of the chamber 10 has the usual boring 21 which is made concentric with and of larger diameter than the piston 16, but smaller than the diameter of the extension 11. The boring 21 is of two diameters, that at 22 at the top being the smaller so that a shoulder 23 results intermediate of its ends. The purpose of this shoulder 23 is to constitute an abutment to a seating washer 24 forming a loose end to an annular member 25 which fits finely into the larger portion of the boring 21, and is of such a length that its other end lies within the lower extension 12 of the chamber 10, this end being in one with the body. A closure 27 is applied within the extension 12 by insertion from its end to abut against the end of the member 25, so that there is an annular cavity 28 between members 25 and 27. The closure 27 is, appropriately, of the screw-plug variety. In the wall of the member 25 intermediate of its ends and below the diaphragm or bridge 13, a plurality of ports 30—30 is provided for establishing the requisite connection between the inlet and outlet sides 14 and 15 of the casing conjunctively with the boring 21 in the diaphragm or bridge 13. The end 31 of the piston 16 is fitted with a dual valve member 31 the piston of which is adapted to be inserted into and withdrawn from the end of the member 25 to close and open the connection. For maintaining a fluid-tight joint between the piston 16 and the member 25, in the annular cavity between washer 24 and member 25 is disposed packing 32 of suitable kind. Similarly, for maintaining a fluid-tight joint between the annular member 25 and the cylindrical extension 12 of the casing, packing 33 is inserted in the aforesaid annular cavity 28. It will thus be seen that on appropriately operating the closure 27 at the end of the under extension 12 of the chamber 10, both sets of packing 32 and 33 are simultaneously adjusted to tighten or slacken them; and that the annular member 25 and its allied packing ring or rings 32 form a unit packing structure capable of various application in all kinds of valves.

The piston of the valve member 31 and the end of the annular member 25 with which it co-operates are of the same diameter; but immediately beyond this end 31 the piston 16 is increased in diameter in two stages so that mitered or bevelled shoulders or flanges 34, 36 result. The purpose of shoulder 34 is to operate as a valve in conjunction with the seating washer 24 and as an ejector of the annular member 25 as I will explain presently, and consequently shoulder 34 is of less diameter than shoulder 23. Shoulder 36 is of greater diameter than shoulder 23, shoulders 36, 23 being designed to function as a shut-off valve on contacting when, for instance, it is required to renew the packing 32—33 associated with the annular member 25. When it is necessary to deal with the packing 32, 33 in connection with the annular member 35, the closure 27 of the lower extension 12 of the chamber 10 is retracted or withdrawn and the piston 16 is advanced, whereupon the shoulder 34 in proximity to the inner end of member 25 abuts upon and starts the ejection of the washer 24 and therefore of the member 25 and its associated packing 32, 33 and continues it until the flange or collar 36 arrives at the shoulder 23 and beds thereon. If not completely ejected, the annular member 25 can be readily removed by hand and replaced when required, followed by the closure 27, a fluid-tight joint being established during the whole of the operations. Shoulder 24 is assisted in its operation by the action of flange 36 on the seat 49 of washer 24.

It will now be seen that valves embodying my invention incorporate multiple seatings in different planes, the piston 16' and its allied packing elements constituting one seating in one plane, and the head 35' and its allied parts constituting one seating or more in another plane.

What I claim and desire to secure by Letters Patent is:

1. A valve for steam and other fluids and liquids having multiple closures in different planes, one of which is formed by a closure member and a seating and another by an imperforate piston forming part of the closure member and moving into and out of fluid tight sliding contact with an adjustable yielding packing element compressible from without the valve in the direction of the gland, the packing element comprising a plurality of packing rings at opposite ends of and supported by a cage member through which the fluid can flow.

2. In a valve structure, a casing having a passageway therein and a shoulder restricting the passageway, a washer in said passageway engaging beneath said shoulder and having an annular flange engaging the radial side of the shoulder, a compressible packing supported in the passageway against the washer, and a valve having a cylindrical part adapted to fit in the washer and the packing and a larger cylindrical part connected to the first cylindrical part by a beveled shoulder, said large cylindrical part adapted to fit in the annular flange with the beveled shoulder engaging the washer.

3. In a valve structure, a casing having a passageway therein and a shoulder restricting the passageway, a washer in said passageway beneath said shoulder and having a flange engaging the radial side of the shoulder, a compressible packing supported in the passageway against the washer, and a valve having a cylindrical part adapted to fit in the washer and the packing, a larger cylindrical part connected to the first cylindrical part by a beveled shoulder, and a second beveled shoulder adjacent the larger cylindrical part, said larger cylindrical part adapted to fit in the flange with the first beveled shoulder engaging the washer and the second beveled shoulder engaging the flange.

In testimony whereof, I affix my signature.

HAROLD LYALL MASON.